Patented May 30, 1939

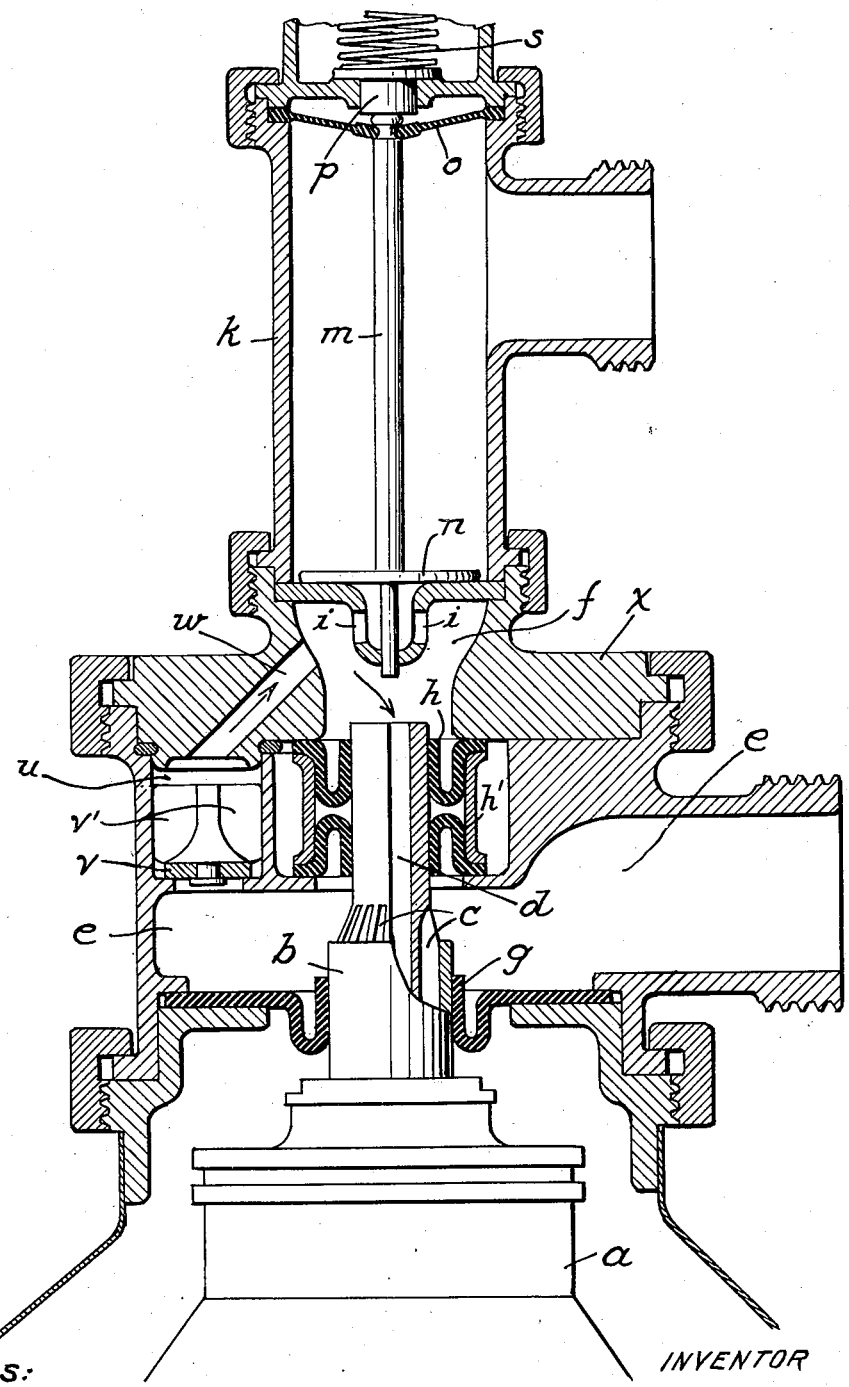

2,160,140

UNITED STATES PATENT OFFICE 2,160,140

CENTRIFUGAL SEPARATOR

Cyrus Howard Hapgood, Nutley, N. J., assignor to The De Laval Separator Company, New York, N. Y., a corporation of New Jersey Application December 9, 1937, Serial No. 178,875

3 Claims. (Cl. 233—21)

In an application for patent filed by me August 26, 1935, Serial No. 37,895, there is disclosed a process and machine for separating high viscosity cream from skim milk, wherein the separated cream and skim milk outflow from a centrifugal separator into and through separate stationary passages closed to the atmosphere. In the cream discharge passage is established a regulable predeterminable yielding mechanical pressure tending to maintain a definite resistance to outflow of cream. In the machine of said application the cream and skim milk are discharged from the bowl through channels formed in the bowl neck, and flexible and elastic packing rings surround the bowl neck and seal the stationary skim milk and cream outflow channels.

In such a separator it is important to maintain the sealing rings immersed in liquid during the time that the separator is rotating. So long as whole milk is being fed to the separator this condition is maintained without special means to provide for it, since the outflow passages are filled with liquid. When, however, feed of liquid to the separator is discontinued, discharge of liquid from the separator ceases. While the stationary skim milk channel remains filled with liquid and consequently the sealing means therefor remains in contact with liquid, a partial vacuum is established at the cream outlet, thereby preventing accumulation of milk in the stationary cream outflow channel. The sealing ring around the upper end of the bowl neck is thus unprotected by liquid and the separator bowl runs dry at this point, causing rapid and serious deterioration of the sealing ring.

The object of my invention is to maintain this sealing ring, as well as the other sealing rings, immersed in liquid during temporary stoppage of the supply of whole milk and while the separator continues its rotation.

While the invention may be thus adapted and applied to the specific construction of closed centrifuge above described, it is obvious that it may be adapted and applied to other types of closed centrifugal separators wherein similar conditions may arise.

A preferred embodiment of the invention as applied to the type of closed centrifuge disclosed in my said application for patent is shown in the drawing, which is a vertical sectional view of the upper part of a separator bowl and the stationary flow passages associated therewith.

In the separator bowl $a$ whole milk is separated into cream and skim milk. Both separated constituents are discharged through the bowl neck $b$, the skim milk through the passages $c$ and the cream through the passage $d$.

Surrounding the bowl neck $b$ is a stationary skim milk receiving and discharge chamber $e$, mounted upon which is a block $x$ having a central cream receiving chamber $f$. Between the skim milk chamber $e$ and the bowl neck is a packing ring $g$ of flexible elastic material which seals the skim milk chamber from the atmosphere around the bowl. Other similar packing rings $h$, $h'$ seal the skim milk chamber $e$ and cream chamber $f$ from communication with each other.

Mounted upon the cream receiving chamber $f$ is a cream outflow cylindrical chamber $k$. The bottom of this cylinder is dished downward and provided with orifices $i$ through which cream flows into the cylinder from chamber $f$. Extending vertically through cylinder $k$ is a valve stem $m$, the lower reduced end of which is guided in the dished-down central part of the bottom of the cylinder. The annular shoulder at the upper end of the reduced lower end portion of valve stem $m$ overlies a valve disc $n$ which rests on the bottom of cylinder $k$, the latter acting as a valve seat. The upper end of the valve stem $m$ rests against a headed pin $p$ extending through the top of cylinder $k$. Across the upper end of cylinder $k$ extends a diaphragm $o$, the peripheral portion of which is confined between the body and top of the cylinder and the central portion of which is confined in an annular groove in valve stem $m$ near its upper end. By means of a spring $s$, the valve stem $m$ and valve $n$ is forced down against the valve seat. The pressure of the spring $s$ may be varied to regulate the fluid pressure required to lift valve $n$ and force cream from chamber $f$ into the valve cylinder $k$. The greater the pressure of the spring, the greater the resistance to flow of cream and the more concentrated the cream. Variations in the resistance to flow of cream through the valve, which variations in the pressure head in the cream discharge tends to produce, are prevented by the diaphragm $o$; that is, pressure of the head of cream against valve $n$ tending to increase resistance to flow is counteracted by the pressure against diaphragm $o$ tending to decrease such resistance.

The above described construction for regulating the density of the cream is a specific embodiment of the invention described in my said application, to which reference is made for a more detailed description of the mode of operation.

In the normal operation of the separator, whole milk is fed continuously into the bowl and skim milk outflows continuously through the discharge e and cream outflows continuously through the chamber f and cylinder k. The packing rings g, h, h' are thus continuously submerged in liquid.

It will be understood that during such operation there is a back pressure on both the skim milk and cream. The back pressure on the skim milk may be assumed, solely for the purpose of illustration, to be two pounds and that on the cream to be twelve pounds. When feed of whole milk to the separator is interrupted, while the bowl continues to revolve, the outflow of the separated constituents ceases. The bowl and the skim milk discharge remains filled, but a partial vacuum is created in the cream receiving chamber f and it is emptied of liquid. The top of the bowl neck, therefore, runs dry. Owing to the high speed of the bowl, a very considerable amount of heat is generated at the bearing between the bowl neck and the packing h, which causes rapid and serious deterioration of the packing.

In a construction embodying my invention this condition is prevented by the following expedient. Formed in the frame enclosing the skim milk discharge chamber e is a valve chamber u having an opening in its bottom communicating with the skim milk discharge chamber. A valve v is seated over this opening. It is provided with wings v' by which it is guided. A channel w, formed in the block x, connects valve chamber u with the cream receiving chamber f.

In the normal operation of the machine the superior pressure in the cream receiving chamber f is operative upon valve v to hold it on its seat. When, however, inflow of whole milk to the separator is interrupted, the pressure in the cream receiving chamber f drops below that in the skim milk receiving chamber e. Valve v is then lifted from its seat and a flow of milk is established from chamber e through valve chamber u, channel w, cream receiving chamber f and passage d back to the bowl. Thereby the packing h is maintained submerged in liquid and the bowl, without inflow of whole milk, may continue to revolve at high speed without injury to any of the sealing devices.

It will be understood that the invention is not limited to the operation of the machine as a milk-cream separator. It will also be understood that centrifuges operating on a different principle but having discharge passages sealed by packing which should not be allowed to run dry may, upon interruption of feed of liquid to the separator, develop conditions which may permit of the adaptation thereto of my invention.

What I claim and desire to protect by Letters Patent is:

1. In a centrifugal separator comprising a rotary bowl having outlet passages for heavier and lighter constituents, stationary chambers into which said constituents are adapted to respectively discharge, a lighter liquid density regulating valve beyond the receiving chamber for lighter liquid and which maintains a superior pressure therein during normal operation of the separator, and flexible packing means engaging the bowl neck and sealing said chambers and submerged in outflowing liquid during the normal operation of the separator; the improvement for maintaining submerged in liquid, during stoppage of feed to the separator, the packing device sealing the lighter liquid receiving chamber which comprises means providing a flow channel between the two receiving chambers, and a valve which is actuable during normal operation of the separator by the superior pressure in the lighter liquid chamber to close said channel and which, during cessation of feed to the separator, is actuated by the superior pressure in the heavier liquid chamber to open said channel and allow flow of liquid therethrough into the lighter liquid chamber to thereby maintain said packing device submerged in liquid.

2. In a centrifugal separator comprising a bowl having a bowl neck provided with an outlet passage for heavier separated liquid terminating below its upper end and an outlet passage for lighter separated liquid terminating above the first named outlet, a frame enclosing a lower receiving chamber communicating with the first named outlet passage and an upper receiving chamber communicating with the second named outlet passage, a lighter liquid density regulating valve beyond the upper chamber and which maintains a superior pressure therein during normal operation of the separator, and flexible packing means between the bowl neck and the frame including a packing device sealing the upper chamber; the improvement for maintaining submerged in liquid said packing device when feed of liquid to the separator bowl is interrupted, which comprises a valve chamber between and communicating with said receiving chambers, and a valve in the valve chamber which is operable by the superior pressure in the upper receiving chamber to close communication between said receiving chambers when the pressure in the upper receiving chamber exceeds that in the lower receiving chamber and which is operable by the superior pressure in the heavier liquid chamber to open such communication when the relative pressures in the receiving chambers are reversed.

3. A centrifugal machine comprising a centrifugal bowl having outlet passages for heavier and lighter separated constituents, stationary chambers into which said constituents are adapted to be discharged, packing means engaging the bowl and sealing the respective chambers and submerged by the liquid therein, a liquid density regulating means operable, during feed to the bowl in the normal operation of the separator, to maintain a higher pressure in one receiving chamber than in the other, said chambers being so arranged as to reverse said pressures when said feed is interrupted, means providing a passage exterior to the bowl between said chambers, a valve in said passage opposed faces of which are subjected to the pressures in the respective chambers and which, while said differential pressure during normal operation of the bowl is maintained, is held in position to close said passage and which, when the relative pressures in the two chambers is reversed, is moved into position to open said passage and, by thus establishing a liquid flow therethrough, maintaining the packing means submerged in liquid.

CYRUS HOWARD HAPGOOD.